April 19, 1927.  
A. C. GRISCOM  
1,625,603  
CUTTER FOR MILK BOTTLE SEAL RINGS  
Filed Sept. 21, 1926 4 Sheets-Sheet 1

Inventor  
Alfred C. Griscom  
By Wooster & Davis  
Attorneys.

April 19, 1927.

A. C. GRISCOM 1,625,603

CUTTER FOR MILK BOTTLE SEAL RINGS

Filed Sept. 21, 1926    4 Sheets-Sheet 3

Inventor
Alfred C. Griscom
By Wooster & Davis
Attorneys.

April 19, 1927.
A. C. GRISCOM
1,625,603
CUTTER FOR MILK BOTTLE SEAL RINGS
Filed Sept. 21, 1926    4 Sheets-Sheet 4
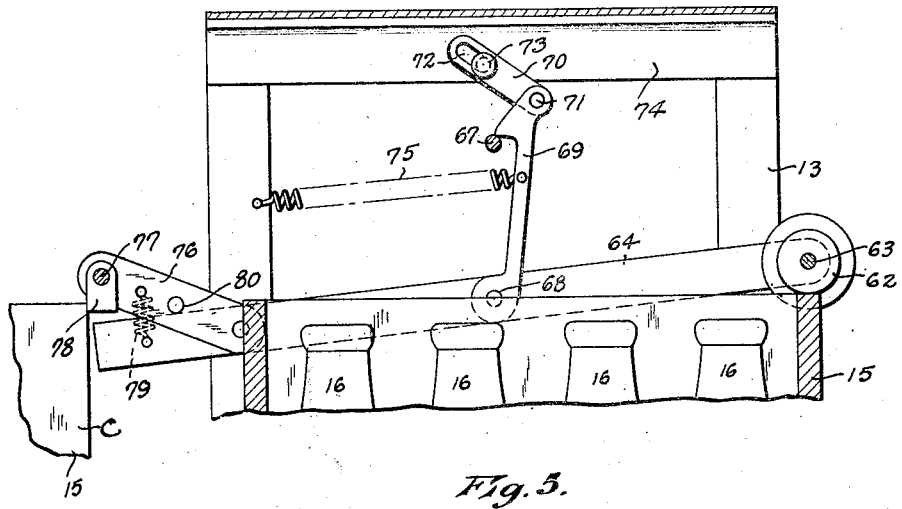
Fig. 5.
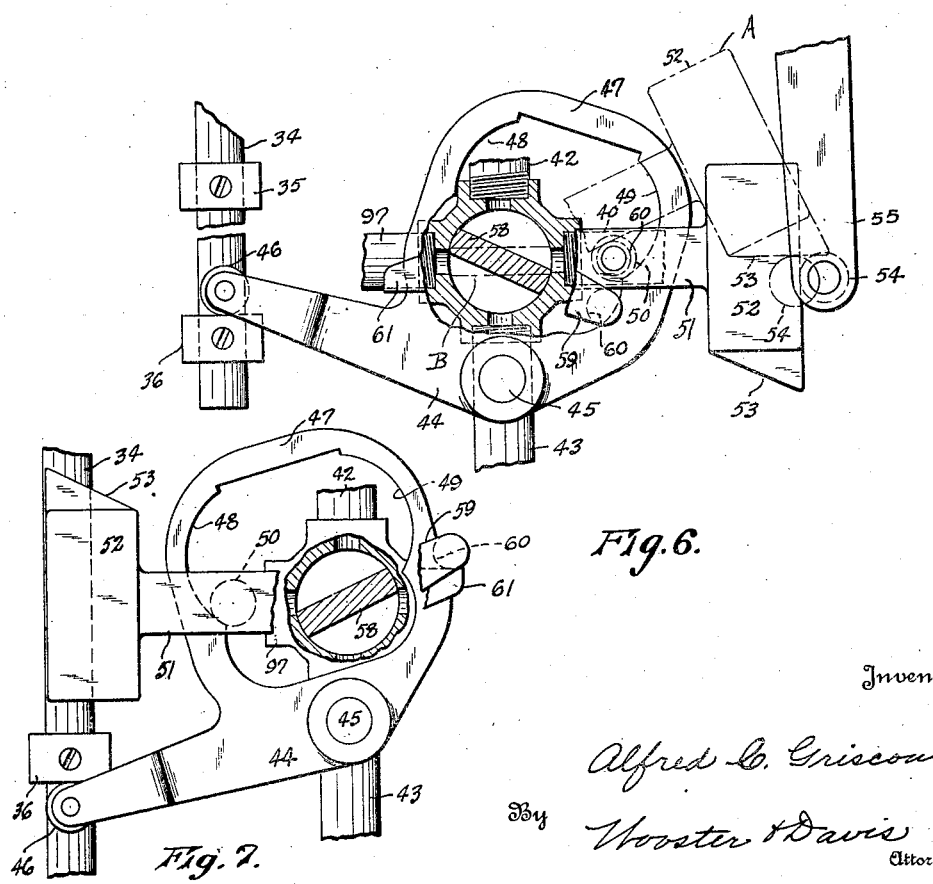
Fig. 6.
Fig. 7.
Inventor
Alfred C. Griscom
By Wooster & Davis
Attorneys Patented Apr. 19, 1927.

1,625,603

UNITED STATES PATENT OFFICE.

ALFRED C. GRISCOM, OF SANDY HOOK, CONNECTICUT, ASSIGNOR TO KING SANITARY PIPE CLEANER COMPANY, OF SANDY HOOK, CONNECTICUT, A CORPORATION OF CONNECTICUT.

CUTTER FOR MILK-BOTTLE SEAL RINGS.

Application filed September 21, 1926. Serial No. 136,783.

This invention relates to a machine for cutting the seal rings on milk bottles. It is an object of the invention to provide a machine for this purpose which may be used with the standard conveyor utilized in dairy plants to carry the milk bottles from the receiving entry to the washing machine.

It is, therefore, another object of the invention to provide a machine which will effectively cut the sealing rings and remove them from the bottles before the bottles enter the washer.

A further object of the invention is to provide a machine which will simultaneously cut all the rings on the bottles in a single crate, and it is a still further object of the invention to provide a device of this character which is entirely automatic and does not need to have an attendant, and also will operate only when bottles are being conveyed by the conveyor.

With the foregoing and other objects in view, I have devised a machine for cutting seal rings on milk bottles, the preferred form of which is illustrated in the accompanying drawings. In these drawings, Fig. 1 is a partial rear elevation and partial section of the device.

Fig. 5 is a longitudinal vertical section showing a portion of the stop mechanism.

Fig. 6 is a detail section and side elevation of the piston control valve, and

Fig. 7 is a similar view showing another position of the valve.

Figure 1:
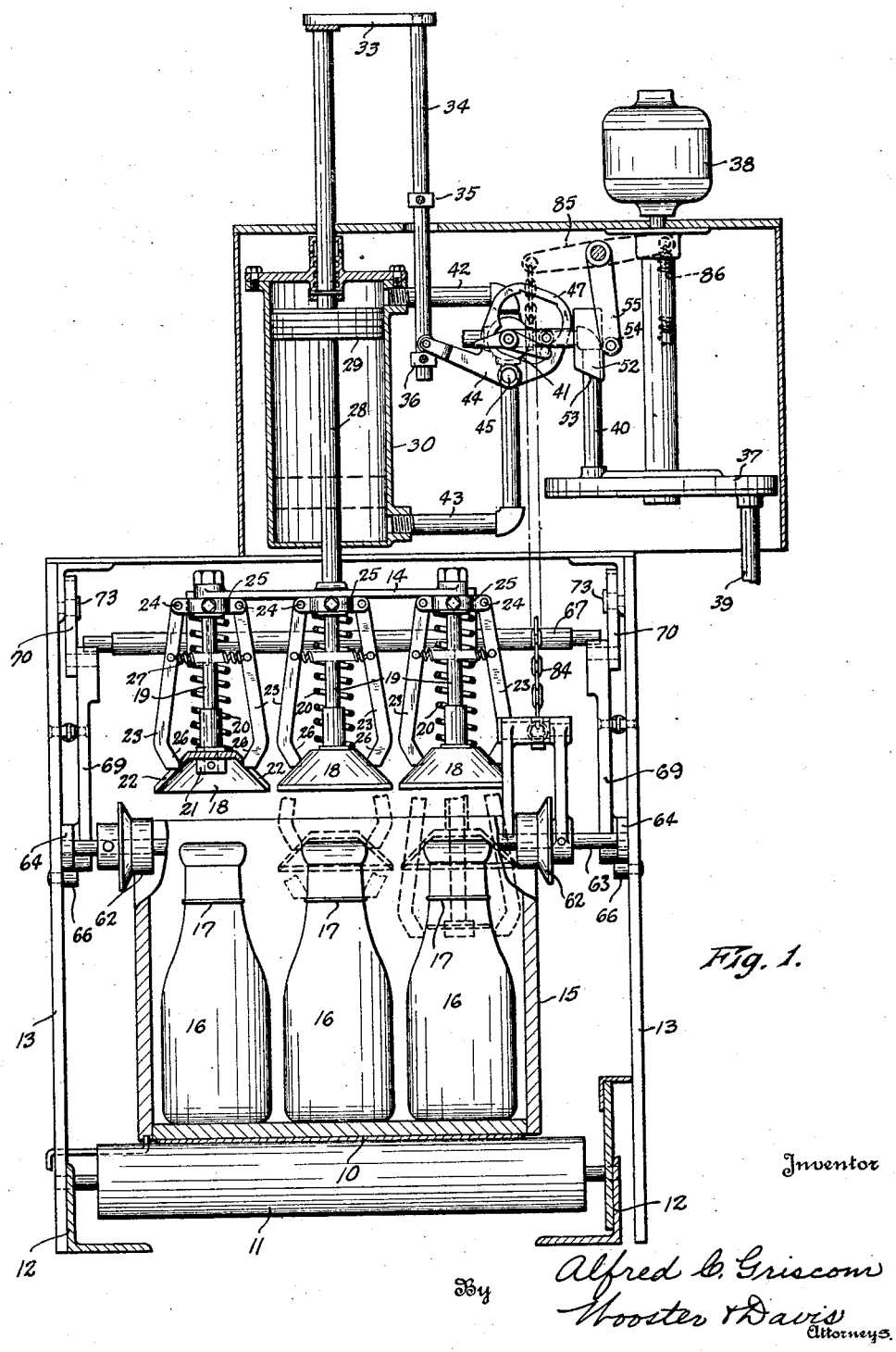

At the present time in marketing certain grades of milk, after the bottle is closed with the usual cardboard disc the whole top of the bottle is enclosed in a paper cap the edges of which are folded down over the flange at the top of the bottle and the upper part of the bottle neck, and it is secured by a wire ring crimped about the depending portion of the cap. When the bottle is opened this ring is merely forced down to allow removal of the paper cap, and the bottle is returned to the dairy with this ring still in position about the neck. These rings must be removed before the bottles can again be used and the common practice at the present time is to remove them by hand, which, of course, is an expensive operation and also results in considerable breakage as the rings are merely pulled off by means of a hook. Also a cutter has been used in connection with the bottle capper, but this does not meet the difficulties caused by the rings, because, to be effective, the rings should be removed before they enter the washer as otherwise they are liable to catch on the mechanism of the washer, interfering with the operation of this machine and causing considerable breakage.

To overcome these difficulties I have devised a machine which will cut the rings from the bottles before the bottles enter the washer, and I have so devised the machine that it may be used with the standard conveyor now generally used in dairy plants to carry the empty bottles from the receiving entry to the bottle washing machine. The bottles are usually returned in crates or boxes, ordinarily with twelve bottles to a crate, which are open at the top with the bottles in the upright position. This crate with the bottles is placed on the conveyor at the receiving entry, and on their way to the washer pass through my machine which with a single stroke cuts the rings from all the bottles in the crate, and therefore, the bottles are free of these rings when they enter the washer. The device is controlled automatically by the movement of the crate so that it operates only as the crate is in the proper position, which arrangement saves power and does not require the services of an attendant.

In general the machine consists of a set of reciprocating cutters or knives, one for each bottle in the crate, and each cutter is mounted in conjunction with a bottle centering device which holds the bottle in proper position during the cutting operation, a piston for simultaneously reciprocating all of the cutters and centering devices; a motor driven pump for operating the piston, and control means for the pump and the motor operated by movement of the crates carrying the bottles on the conveyor.

In the drawings the conveyor for conveying the crates and bottles from the receiving entry to the bottle washer is shown as a moving belt 10 running over suitable supporting rollers 11 mounted in a suitable frame 12, and it will, of course, be understood that this belt is operated continuously by suitable drive mechanism. Secured to the sides of the frame are upright supports 13 which carry the ring cutting mechanism and the operating means therefor. This mechanism comprises a head or plate 14 which carries a plurality of bottle centering devices and cutters for cutting the rings. As mentioned above, the bottles are returned to the dairy in a crate indicated at 15 with usually twelve bottles 16 to the crate, and the loose ring on the bottles is indicated at 17. There is a bottle centering device and a ring cutting mechanism for each bottle, and therefore, in the present machine there are twelve centering devices and twelve sets of cutters carried by the head or plate 14. Each centering device comprises a hollow conical member 18 which is slidably mounted on a rod 19 carried by the plate 14, and a spring 20 tends to force this cone downwardly against the stop ring 21 on the rod. Each cone has diametrically opposite slots 22 in its side walls through which the cutters or knives 23 extend. It will be noted there are two cutters for each cone pivotally mounted at 24 in the cross head 25 secured to the rod 19, and which project at their lower ends into the slots 22. Adjacent these lower or cutting ends the cutters are bent inwardly to form inclined walls 26 which engage the bottoms of the slots 22 and are guided thereby. Suitable springs 27 connecting the two cutters tend to draw them toward each other and hold them against the bottoms of the slots. The slots are of such a depth as to hold the cutters separated a sufficient distance to slide over the flange at the top of the bottle.

The head or plate 14 is mounted on a piston rod 28 connected to a piston 29 reciprocating in a cylinder 30. The plate is also connected to guide rods 31 on opposite sides of the cylinder connected by means of arms 32 to the piston rod above the piston. Also connected to the piston rod above the piston is an arm 33 carrying a control rod 34 which has adjustably mounted thereon suitable stop collars 35 and 36 which are used to control the operation of the piston.

The piston is operated by liquid pressure from a suitable pump 37 which is driven by an electric motor 38. This pump is shown as a rotary pump drawing liquid through an inlet 39 from a suitable source of supply and forcing it through the outlet 40 to the opposite sides of the piston as determined by the control valve 41. This valve is a four-way valve connected to the upper and lower parts of the cylinder on opposite sides of the piston by pipes 42 and 43 respectively. A lever 44 pivoted at 45 has an arm carrying a roller 46 in position to be engaged by the stop collars 35 and 36 as they are reciprocated with the piston. These stop collars swing the lever in opposite directions at the upper and lower portions of the piston strokes to permit entrance of liquid under pressure above and below the piston and exhaust the same through the valve 41. The lever 44 includes a yoke 47 having curved surfaces 48 and 49 which are adapted to engage a roller 50 on a lever 51 carrying a weight 52 which has an inclined lower end 53 adapted to rest under certain conditions on a roller 54 carried by a latch 55. The lever 51 is mounted to swing freely on a bushing 56 on the valve stem 57. This stem is integral with or rigidly connected to the movable valve member 58. An arm 59 is rigidly secured to the stem 57 and has a lateral projection 60 extending in the plane and the path of movement of the lever 51. The lever 51 includes an extension 61 on the opposite side of the valve stem from the weight 52 which is adapted to engage the other side of the projection 60 to swing the valve in the opposite direction. The operation of this valve will be explained more fully under the operation of the machine.

There is a stop mechanism provided for properly locating the crate under the cutting mechanism. This stop comprises a pair of rollers 62 mounted on a cross rod 63 carried in side members 64 pivoted to the rear upright supports 13 at 65. Suitable stop pins 66 carried by the other uprights limit the downward movement of the free ends of these side members and the stop rollers 62. A cross rod 67 for lifting the stop rollers 62 to release the crate is attached to the plate or head 14 carrying the cutters and the centering devices. Pivoted to each of the side members 64 of the stop at 68 is a hook 69 and there is a link 70 pivotally connected at 71 to the hook, and it has an elongated slot 72 through which extends a pin 73 carried by the frame members 74. A suitable spring 75 tends to swing the hook to the left, as viewed in Figs. 2 and 5. At the rear end of the stop, and preferably pivoted on the same pivot 65, is a second stop comprising side arms 76 carrying a cross rod 77 supporting depending stops 78. A spring 79 tends to hold the free ends of the side arms downwardly, which movement is limited by stops 80. The cross rod 63 also carries a supporting arm 81 for a trip lever 82 which has an arm 83 connected by a chain 84 to an arm 85 connected to the latch 55. The trip lever 82 is in the path of movement of the crate when the stop 62 is in the lower position, and a spring 86 is connected to an extension of the arm 85 and tends to swing it clockwise, as viewed in Fig. 1, which will swing the roller 54 into the path of movement of the weight 52.

There is an automatic control for stopping the motor 38 when there is no crate in the machine and also for starting the motor when a crate is conducted to the machine. This control is shown somewhat diagramatically in Fig. 2. It may comprise a snap switch 87 operated by a lever 88 pivoted at 89 to the frame 12 and at its upper end, when the switch is off, projecting into the path of movement of a crate 15 on the conveyor 10, as indicated in dotted lines. It is to be understood that this lever is located on the inlet side of the machine. A similar lever 90 is pivoted at 91 at the outlet side of the machine, and when the switch is in the "on" position represented by the pull lines of the two levers, the upper end of the lever 90 projects into the path of movement of the crate as it leaves the machine. A connecting rod in two sections 92 and 93 connects the levers 88 and 90 on the opposite sides of their pivots, and these sections are connected by a connection which allows relative movement against the action of a spring 94. This may be accomplished by pins 95 in slots 96, so that should a crate be at the inlet side of the machine and hold the snap switch in the "on" position while another crate is leaving the machine, this latter crate may swing the lever 90 without operating the switch.

The operation is as follows: We will assume there is no crate in the machine and the device is, therefore, not operating. Now if a crate 15 carrying a set of bottles is placed on the belt 10 it will be carried by this conveyor to the inlet side of the machine, which is the left side, as viewed in Fig. 2, the direction of movement being indicated by the arrows. In this position, with no crate in the machine, the stop device 62—64 is in its lower position shown in Fig. 2, and the trip lever 82 is in its dotted line position. Also, as shown in Fig. 6, the weight 52 is in the dot and dash line position indicated at (A) with its lower inclined end 53 resting on roller 54 carried by the latch 55. This will hold the valve 58 in the dot and dash line position (A') which is the neutral position and does not permit passage of liquid through the valve. Furthermore, the motor is not operating as the switch 87 is in the "off" position with the levers 88, 90 in their dotted positions.

As the crate approaches the machine it will engage the lever 88 (Fig. 2) and swing it to the full line position to close the switch. This will start the motor operating and the pump operated thereby will generate pressure. As the stop mechanism 62—64 is in its lower position the stops 78 are in their upper position allowing the crate to move into the machine under the cutters and bottle centering devices, as shown in Fig. 2, with its forward end engaging the stop rollers 62. During the latter portion of this movement the forward end of the crate engages the trip lever 82 and swings it counterclockwise or to the right, as viewed in Fig. 2, to its full line position. This movement under the action of the chain 84 will swing the latch 55 to the right, as viewed in Fig. 6, and move the roller 54 from beneath the weight 52. This allows the weight to drop to its full line position, (Fig. 6) and the under side of the lever 51 to engage the projection 60 to swing the arm 59 downwardly and the valve 58 to its full line position. This permits liquid under pressure from the pump to pass to upper side of the piston through the inlet pipe 42 and will force the piston downwardly. This downward movement of the piston will carry with it the knives or cutters 23 and the conical centering members 18. These centering members will engage their inclined inner walls against the tops of the flanges on the bottles, as indicated in dotted lines, Fig. 1, and the coaction of the inclined walls with the walls of the flanges will center each bottle. During this part of the movement the knives or cutters are held separated by the engagement of the inner end of the slots 22 with the knives adjacent their lower ends. Continued further movement of the piston and the plate 14 will carry the knives downwardly, but the conical members 18 will remain stationary sliding on the rods 19, and the pressure of the springs 20 will securely hold the bottles in the proper position. As the knives move downwardly relative to the conical members their lower free cutting ends are retained against the side walls of the bottle by the springs 27 as they are allowed to move inwardly because of the inclined walls 26. They will, therefore, engage the seal rings 17 with their cutting edges and by their downward movement will cut them in two so that they will drop from the bottles. It will be obvious that as there is a set of knives and a centering device for each bottle the rings on all the bottles in the crate are cut simultaneously with a single stroke of the piston.

As the piston has moved downwardly it has carried with it the control rod 34, and adjacent the extreme lower end of its movement the stop collar 35 engages the roller 46 on the lever 44 and swings it downwardly. This movement will swing the yoke 47 to the left, and by camming action of the curved surface 49 on the roller 50 will swing this roller and the weight 52 upwardly or counterclockwise, as viewed in Figs. 6 and 7, and after the weight passes the vertical center line of its pivot gravity will swing it to its extreme left hand position shown in Fig. 7. During the last part of this movement the extension 61 will engage the under side of the projection 60 and will swing the arm 59 upwardly to the position shown in Fig. 7. This will swing the valve to the dotted position (B) Fig. 6 and the full line position of Fig. 7 permitting pressure from the pump to pass through the pipe 43 to the under side of the piston and the liquid on the upper side of the piston to be exhausted through the pipe 97. This, of course, will force the piston upwardly and will raise the knives and the centering devices to the upper full line position of Fig. 1 above the crate. It will, of course, be understood that if water under pressure is available, as from a city water supply, the pump 37 and motor 38 may be omitted and the water supply connected directly to the inlet 40 for the control valve 41.

As the piston moves upwardly and raises the centering devices and the knives at the end of the cutting stroke, it carries with it the cross rod 67, and adjacent the upper end of this stroke this rod engages under the hooks 69 and raises the side members 64 and the stop rollers 62 from engagement with the end of the crate. The crate is immediately carried forwardly by the conveyor belt 10, and as the piston and plate 14 approach their upper position the pins 73 engage the inner ends of the slots 72 in the links 70 forcing the hooks 69 to one side and releasing them from the cross rod 63. This allows the side members 64 and the stop rollers 62 to drop, but as the crate has not yet left the machine the rollers 62 will run along the top of the crate, as indicated in Fig. 5, until the crate has wholly left the machine, when they will drop to their original stop position to arrest the movement of the next crate to enter the machine. It is, of course, desirable that the following crates do not enter the machine until the first crate has left it. Therefore, while the stop rollers 62 are raised, as shown in Fig. 5, the second stops 78 are lowered into the path of movement of the following crate, indicated at (C), and will hold this crate from entering the machine until the former crate has completely cleared it, when, of course, as the rollers 62 drop the stop 78 will be raised allowing the second crate to enter the machine. As this crate comes to rest against the stop rollers 62 it will again trip the lever 82 and the cycle will be repeated. If the second crate (C) should happen to be closely following the first crate the stops 78 will engage the top of the crate as the stops 62 are raised. No harm will be done, however, as the arms 76 carrying the stops 78 will merely swing upwardly about their pivots against the action of the springs 79.

Figure 2:
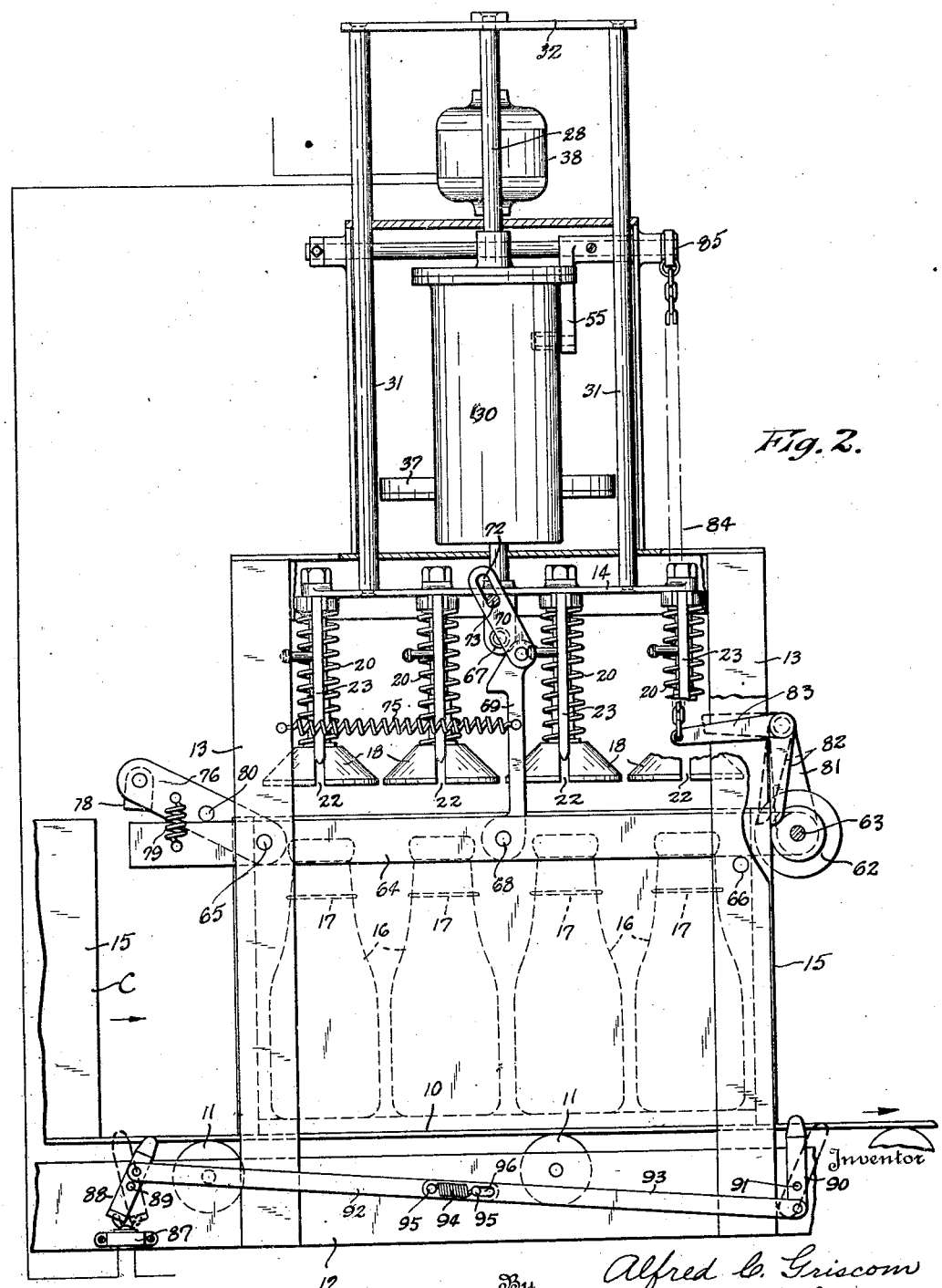
Fig. 2 is a side elevation of the device.
Figure 4:
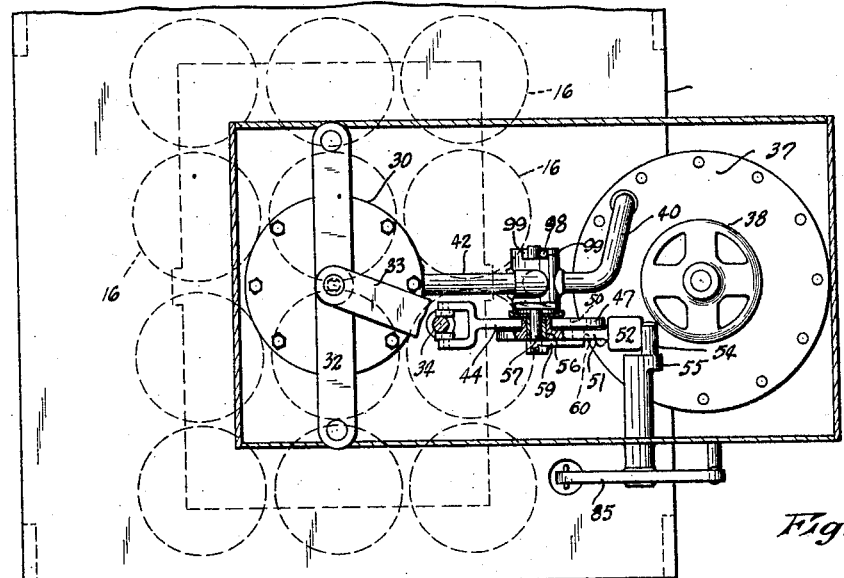
Fig. 4 is a cross section above the operating mechanism showing the control mechanism in plan view.
Figure 3:
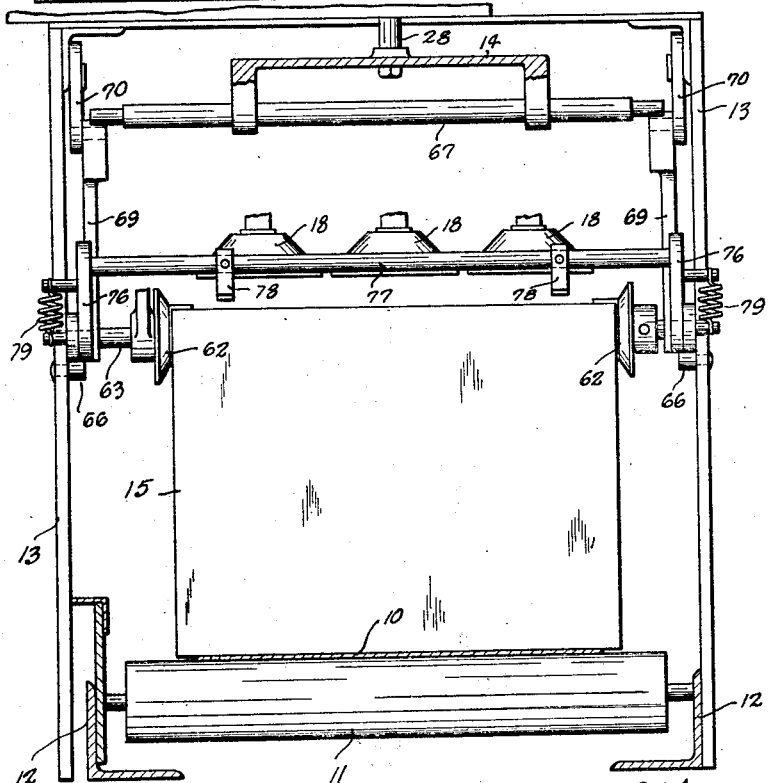
Fig. 3 is a front elevation of the lower portion of the device showing the conveyor in section.

As the piston moves upwardly it will, of course, carry with it the control rod 34, and adjacent the limit of its upward movement the lower stop collar 36 engages the under side of the roller 46 and swings the lever 44 to the right or clockwise, as viewed in Figs. 1, 6 and 7. During this movement the curved surface 48 on the yoke 47 will act on the roller 50 to swing the weight 52 to the right or clockwise, but at this time the arm 55 is swung to the left and the roller 54 is in the path of movement of the weight. It will, therefore, prevent the weight from completing its stroke and will hold it in the dot and dash line position (A) in Fig. 6 with the valve 58 in the neutral position. During the latter part of this movement the lever 51 carrying the weight engages the projection 60 on the valve stem and moves the valve to this neutral position. The machine is now ready for the next operation on the bottles in the following crate. It will, of course, be understood the movements of the weight 52 in the opposite directions are limited by suitable stops, not shown, or there may be the usual stop pin 98 on the valve to engage shoulders 99 on the valve casing to limit the movements of the valve.

As the crate leaves the machine after the rings have been cut it swings the lever 90 which will shift the snap switch 87 to the "off" position stopping the operation of the machine. If at this time there should happen to be a following crate in engagement with the lever 88 the lost motion connection between the sections 92—93 connecting the levers will allow the lever 90 to swing without affecting the switch.

It will be apparent from the foregoing description that the device is entirely automatic and is controlled by the movement of the crates on the conveyor as they are carried from the receiving entry to the washer. It will also be apparent that the rings are removed from the bottles before they enter the washer, and therefore, there is no danger of their catching on the washing mechanism with the consequent breakage of bottles and injury to the washer.

Having thus set forth the nature of my invention, what I claim is:

1. In a cutter for milk bottle seal rings, a conveyor for crates carrying a plurality of bottles, a cutter for the ring of each bottle, and means controlled by the crate for moving the cutters to cut the rings.

2. In a cutter for milk bottle seal rings, a conveyor for transferring bottles from the receiving station to the bottle washer and adapted to carry a holder for the bottles, and means controlled by movement of the holder for cutting the rings on the bottles.

3. In a cutter for milk bottles seal rings, a reciprocating member carrying a plurality of cutters, a plurality of bottle centering devices associated with said cutters, and means for reciprocating the cutters.

4. In a cutter for milk bottle seal rings, a plurality of vertically reciprocable cutters, a support for a container carrying a plurality of bottles beneath said cutters, a plurality of reciprocable bottle centering means, and means for operating the centering means and the cutters.

5. In a cutter for milk bottle seal rings, a reciprocating member carrying a plurality of cutters, a plurality of bottle centering devices associated with said cutters, means for moving a container carrying a plurality of bottles to and from operative position with respect to the cutters and centering devices, and means controlled by movement of said container for reciprocating said cutters.

6. In a cutter for milk bottle seal rings, a plurality of vertically reciprocable cutters, a conveyor for a container carrying a plurality of bottles located beneath said cutters, a plurality of reciprocable bottle centering means, and means controlled by movement of said container for reciprocating the cutters and the centering means.

7. In a cutter for milk bottle seal rings, a hollow substantially cone shaped member adapted to engage the top of a bottle to center the same and provided with guides, pivoted cutters mounted in the guides, means to force the cone shaped member and the cutters longitudinally of the bottle from the top thereof, said cone shaped member being mounted for movement relative to the cutter, and a spring tending to hold said member against the bottle.

8. In a cutter for milk bottle seal rings, a centering member having a tapered chamber in its under side to engage the top of a bottle to center the same, a rod on which said member is slidably mounted, a pair of cutters having pivots fixed to the rod and guided at their free ends by said member to keep them separated to pass over the flange of the bottle and then to move inwardly to engage the ring, a spring to hold the centering member against the bottle, and means to reciprocate the centering member and the cutters.

9. In a cutter for milk bottle seal rings, a movable centering device arranged to engage the end of a bottle to center the same, a cutter associated with said device in position to engage a ring to cut the same, and means to move the centering device to engage the bottle and then shift the cutter to sever the ring.

10. In a cutter for milk bottle seal rings, a movable centering device arranged to engage the end of a bottle to center it, a pair of pivoted cutters associated with said centering device and arranged on opposite sides of the bottle, coacting guide means on the centering device and the cutters, and means for shifting the centering device to position the bottle and shifting the cutters to cut the ring.

11. In a cutter for milk bottle seal rings, a reciprocable head, a plurality of rods depending therefrom, a cone shaped centering device slidably mounted on each rod, a pair of cutters pivotally connected to the rod and extending on opposite sides of the centering device, springs tending to hold the centering devices in their lower positions, springs tending to swing the cutters inwardly toward the centering devices, and means for reciprocating the head.

12. In a cutter for milk bottle seal rings, a rod mounted for reciprocation longtudinally of a bottle, a cone shaped bottle centering device carried by the rod and mounted to reciprocate thereon, a spring tending to hold said device in one extreme position on the rod, said devce being provided with a guide slot in one side wall thereof, a pivoted cutter guided for lateral movement in the said slot, and means for reciprocating the centering device and the cutter.

13. In a cutter for milk bottle seal rings, a conveyor for crates carrying a plurality of bottles, a reciprocating device mounted above the conveyor and including bottle centering means and ring cutters associated therewith, a stop normally in position to engage the crate to arrest its movement and hold it under the cutters, means for reciprocating the cutters and centering devices. and means operated by said movement to release the stop.

14. In a cutter for milk bottle seal rings, a conveyor for crates carrying a plurality of bottles, a frame structure extending above the conveyor, movable bottle centering devices and ring cutters mounted above the conveyor, a stop device comprising side members pivoted to said frame structure and carrying stop means to engage the end of a crate and hold it in position under the centering devices and cutters, means for lifting said stop device to release the crate as the cutters are moved away from the bottles, and means to release said stop device as the cutters approach their upper positions.

15. In a cutter for milk bottle seal rings, a conveyor for crates carrying a plurality of bottles, a frame structure extending above the conveyor, movable bottle centering devices and ring cutters mounted above the conveyor, a stop device comprising side members pivoted to said frame structure and carrying stop means to engage the end of a crate and hold it in position under the centering devices and cutters, hooks pivoted to the side members, a transverse rod movable with the cutters and centering devices adapted to engage the hooks to lift said stop means, and means for releasing the hooks at a given position in the movement of the cutters.

16. In a cutter for milk bottle seal rings, a conveyor for crates carrying a plurality of bottles, a frame structure extending above the conveyor, movable bottle centering devices and ring cutters mounted above the conveyor, a stop device in position to engage the front of a crate to hold it in position under the bottle centering devices, a second stop operated in conjunction with the first stop to arrest movement of a following crate on the conveyor until the first crate clears the device, and means for operating said stops in certain timed relation with the movements of the cutters and centering devices.

17. In a cutter for milk bottle seal rings, a conveyor for crates carrying a plurality of bottles, a vertically reciprocable piston in a cylinder above the conveyor, a plurality of bottle centering devices and ring cutters operated by said piston, a source of fluid pressure for operating the piston, a control valve for controlling the flow of fluid to the cylinder, means operated by the piston to shift the valve at the extreme lower position of the piston to reverse its movement and to place the valve in neutral position at the upper extreme movement of the piston, and means controlled by movement of the crate on the conveyor to shift the valve to cause downward movement of the piston.

18. In a cutter for milk bottle seal rings, a conveyor for crates carrying a plurality of bottles, a plurality of movable bottle centering devices and ring cutters above the conveyor, a piston for operating said devices, a pump for generating fluid pressure to operate said piston, a motor for operating the pump, means operated by movement of the crate for controlling the operation of the motor, and means operated by said crate for controlling the fluid for operating the piston.

In testimony whereof I affix my signature.

ALFRED C. GRISCOM.